US008689192B2

(12) United States Patent
Dargelas (10) Patent No.: US 8,689,192 B2
(45) Date of Patent: Apr. 1, 2014

(54) NATURAL LANGUAGE ASSERTION PROCESSOR

(75) Inventor: Alain M. Dargelas, Milpitas, CA (US)

(73) Assignee: Synopsys, Inc., Mountain View, CA (US)

(*) Notice: Subject to any disclaimer, the term of this patent is extended or adjusted under 35 U.S.C. 154(b) by 1135 days.

(21) Appl. No.: 12/352,423

(22) Filed: Jan. 12, 2009

(65) Prior Publication Data
US 2010/0179804 A1    Jul. 15, 2010

(51) Int. Cl.
*G06F 9/45* (2006.01)
(52) U.S. Cl.
USPC ........... 717/137; 717/106; 717/112; 717/136; 704/2; 704/9; 704/10
(58) Field of Classification Search
None
See application file for complete search history.

(56) References Cited

U.S. PATENT DOCUMENTS

| | | | | |
|---|---|---|---|---|
| 5,537,330 | A * | 7/1996 | Damiano et al. | 716/104 |
| 5,890,103 | A * | 3/1999 | Carus | 704/9 |
| 6,481,008 | B1 * | 11/2002 | Chaiken et al. | 717/158 |
| 6,591,403 | B1 * | 7/2003 | Bass et al. | 716/102 |
| 7,013,261 | B2 * | 3/2006 | Eisele | 704/9 |
| 7,823,101 | B2 * | 10/2010 | Sugihara | 716/136 |
| 2004/0133409 | A1 * | 7/2004 | Mukherjee et al. | 703/14 |
| 2004/0163072 | A1 * | 8/2004 | Levy | 717/106 |
| 2005/0071147 | A1 | 3/2005 | Clarke et al. | |
| 2005/0209840 | A1 | 9/2005 | Baklashov et al. | |
| 2006/0190851 | A1 | 8/2006 | Karaki et al. | |
| 2008/0104556 | A1 | 5/2008 | Yamada | |
| 2008/0208565 | A1 * | 8/2008 | Bisegna | 704/4 |

OTHER PUBLICATIONS

Hoffmann et al., "The hardware verification workbench", Special Issue on the PROSPER Project, Technische Universitat Kaiserslautern Department of Computer Science Publication 2001.*
Holt, Alexander, "Formal verification with natural language specifications: guidelines, experiments and lessons so far", South African Computer Journal, No. 24, Nov. 1999, pp. 253-257.*
Fantechi et al., "Assisting requirement formalization by means of natural language translation", Formal Methods in System Design, May 1994, vol. 4, Issue 3, pp. 243-263.*
Mavaddat, Farhad. "On transforming code generation to a parsing problem." Code Generation for Embedded Processors. Springer US, 2002. 153-170.*
Vardi, Moshe Y. "Formal techniques for systemc verification; position paper." Design Automation Conference, 2007. DAC'07. 44th ACM/IEEE. IEEE, 2007.*

* cited by examiner

*Primary Examiner* — Don Wong
*Assistant Examiner* — Adam Conkey
(74) *Attorney, Agent, or Firm* — Bever, Hoffman & Harms, LLP; Jeanette S. Harms (57) ABSTRACT

A method of processing natural language assertions (NLAs) can include identifying an NLA and then translating that NLA into a verification language assertion (VLA) using a natural language parser (NLP) and synthesis techniques. This VLA can be translated into an interpreted NLA (NLA*) using a VLA parser and pattern matching techniques. At this point, the process can allow user review of the NLA* and the NLA. When the user determines that the NLA* and the NLA are the same or have insignificant difference, then verification can be performed using the VLA. The results of the verification can then be back annotated on the NLA. In one fully-automatic embodiment, in addition to comparing the NLA and the NLA*, the VLA and a VLA* (generated from the NLA*) can be compared, thereby providing yet another test of accuracy for the user during verification.

21 Claims, 11 Drawing Sheets

Controller RTL
Code 300

301
module cntrlr(clk, reset, busAddr, busData, busRdWr_N, adxStrb, rdWr_N, ceO_N, ce1_N, ce2_N, ce3_N, ramAddr, ramData);

302
input clk, reset, busRdWr_N, adxStrb;
input [7:0] busAddr;
inout [7:0] busData;
output rdWr_N, ce0_N, ce1_N, ce2_N, ce3_N;
output [5:0] ramAddr;
inout [7:0] ramData;

303
// NLA: On positive edge of clk, if b_reading rises and ce2_N stabilizes, then busData should be equal to "mem[$past( busAddr,3 )]".

// NLA: On positive edge of clk, if ce0_N or ce1_N or ce2_N or ce3_N rise, then adxStrb should be high at most 2 clk cycle later // NLA: On negative edge of clk, if ce0_N or ce1_N fall, then adxStrb must fall no more than three clk cycle later // NLA: On negative edge of clk, if ce0_N or ce1_N fall, then adxStrb must fall after 6 or more cik cycle

304
endmodule

NLA: On posedge clk, if ce0_N or ce1_N or ce2_N or ce3_N rise, then b_ce_idle should stay high for at least 1 cycle followed by adxStrb high after 1 cycle.

NLP Output:

320

```
(ROOT
 (S
  (PP (IN On)
   (NP (JJ posedge) (NN clk)))
  (, ,)
  (SBAR (IN if)
   (S
    (NP
     (NP (NN ce0_N)
      (CC or)
      (NN ce1_N))
     (CC or)
     (NP (NN ce2_N)
      (CC or)
      (NN ce3_N)))
    (VP (VBP rise))))
  (, ,)
  (NP (RB then) (NN b_ce_idle))
  (VP (MD should)
   (VP (VB stay)
    (ADJP (JJ high))
    (PP (IN for)
     (NP
      (NP
       (QP (IN at) (JJS least) (CD 1))
       (NN cycle))
      (VP (VBN followed)
       (PP (IN by)
        (NP (NN adxStrb) (NN high)))
       (PP (IN after)
        (NP (CD 1) (NN cycle)))))))))
  (. .)))
```

NATURAL LANGUAGE ASSERTION PROCESSOR

BACKGROUND OF THE INVENTION

1. Field of the Invention

The present invention relates to natural language assertions and in particular to providing a process/processor that can automatically analyze natural language assertions and convert them into verification language assertions and then generate interpreted natural language assertions from those verification language assertions, thereby allowing meaningful user review during verification.

2. Description of Related Art

Designs of integrated circuits (ICs) are increasingly becoming more complex, which in turn increases the desirability of faster verification of such designs. Unfortunately, the breakthroughs in design complexity frequently outpace verification process improvements. This disparity can be explained in part by the different languages used. Specifically, hardware description languages (HDLs) for IC design, such as Verilog or VHDL, use standard, text-based expressions of the spatial and temporal structure and behavior of electronic systems. Therefore, HDLs are well understood and accepted by designers. In contrast, verification languages, such as System Verilog, VERA, or E!, have a much higher level of formalism than HDLs, thereby resulting in much lower user acceptance.

Certain expressions used in software programming, called assertions, can contribute to the formalism of verification languages. An assertion is an expression that, if false, indicates an error. In the context of an HDL design, an assertion can check for specific behavior and display a message if that specific behavior occurs. Assertions can monitor both "good" and "bad" behavior. Unlike the standard, text-based expressions of HDLs, assertions tend to be designer-specific. That is, a user cannot easily read assertions written by others. Therefore, a user who is not the author of the assertions may well ignore assertions having a "Fail" status in verification.

Assertions can advantageously increase the controllability and the observability of a design during verification. Therefore, a need arises for a process of facilitating more use of assertions while increasing their readability.

SUMMARY OF THE INVENTION

A method of processing natural language assertions (NLAs) can include identifying an NLA and then translating that NLA into a verification language assertion (VLA) using a natural language parser (NLP) and synthesis techniques. This VLA can be translated into an interpreted NLA (NLA*) using a VLA parser and pattern matching techniques. At this point, the process can allow user review of the NLA* and the NLA. When the user determines that the NLA* and the NLA are the same or have insignificant difference, then verification can be performed using the VLA. The results of the verification can then be back annotated on the NLA.

In one embodiment, each identified NLA can be compared to a set of NLAs in a cache. When the NLA matches one NLA in the set of NLAs, the process can proceed directly to performing the verification, wherein the verification is performed with a VLA stored in the cache and associated with the matched NLA. When the NLA does not match the one NLA, the process can proceed to the steps of translating.

Another completely-automated method of processing natural language assertions (NLAs) can include identifying an NLA and then translating that NLA into a verification language assertion (VLA) using a natural language parser (NLP) and synthesis techniques. This VLA can be translated into an interpreted NLA (NLA*) using a VLA parser and pattern matching techniques. At this point, the NLA* can be translated into an interpreted VLA (VLA*). The VLA and the VLA* can be compared. When the VLA and VLA* are different, the method can provide a warning. When the VLA and the VLA* are not different, verification can be performed using the VLA. Therefore, in this embodiment, in addition to comparing the NLA and the NLA*, the VLA and the VLA* can be compared, thereby providing yet another test of accuracy for the user during verification.

The NLA parser, which forms part of an NLA processor, can advantageously create a natural language semantic tree for each sentence. The NLA processor can then use this tree to generate the VLA. Exemplary techniques used by the NLA processor to generate the VLA can include, for example, text transformations, text maintenance, and expression matching. Text transformations can include prose to numerical transformation (e.g. "zero"->0 and "one"->1) as well as contraction formation (e.g. "should not"->shouldn't). Text maintenance can be identified using double quotes. For example, an "a+b" expression in the NLA can be carried over to the VLA as-is. Similarly, when a variable name is an English word, clarification can be achieved by placing that variable name in double quotes (e.g. the NLA may state if "a" occurs, then . . . ). Expression matching looks at multiple terms when bounded by periods. For example, one form of an assertion is a "concurrent assertion" which could be (Clocking sequence) (Antecedent)->(Consequent). Such an assertion could have a corresponding NLA form such as, "On positive edge of clock clk, if "a" occurs then "b" should occur after n clock cycles." In this case, matching the three distinct parts of the concurrent assertion in the NLA is a pattern matching problem. Another form of an assertion is variable complementing (e.g. "is not high"->low).

In one embodiment, each step of identifying and translating (performed by the NLA processor) can process a plurality of assertions. In this embodiment, the NLA processor can include multiple processors for parallelizing the processing of those assertions.

A system for processing NLAs can include an NLA processor and a set of simulator and verification tools. The NLA processor can receive a plurality of NLAs associated with a description of an integrated circuit (IC) and transform the plurality of NLAs into a plurality of verification language assertions (VLAs). The set of simulator and verification tools can receiving the plurality of VLAs and the description of the IC and generate a report indicating failures of the VLAs.

BRIEF DESCRIPTION OF THE FIGURES

Each of FIGS. 3B-3E illustrates exemplary coding for VLAs and interpreted NLAs generated from original NLAs in accordance with the present invention.

DETAILED DESCRIPTION OF THE FIGURES

Assertions can advantageously increase the controllability and the observability of an IC design during verification. Unfortunately, the use of assertions during verification is currently inhibited by the difficulty of interpreting assertions written by others. In accordance with one aspect of the invention, a process and/or processor can automatically translate an easily understood English expression of a design behavior, called a natural language assertion (NLA) herein, into a verification language assertion (VLA). This VLA can be translated back into an interpreted NLA, thereby facilitating a meaningful user review between the original and interpreted NLAs. When the review indicates that no substantial discrepancies exist between the original and interpreted NLAs, verification of the design can be performed with the VLA. The results of this verification can then be back annotated on the original NLA.

To clarify the distinction between an NLA and a VLA, a design of a traffic controller may be helpful. In an exemplary traffic controller, at least five NLAs can be expressed for proper operation: (1) when a green or yellow light is showing, the cross street must get red light, (2) lights must change in the conventional green, yellow, and red sequence, (3) when traffic is waiting at a red light, traffic must be given a green light if there is no traffic on the cross street, (4) traffic must not wait more than five ticks at a red light, even if the cross street has traffic, and (5) when sensors indicate traffic, the sensors do not reset until a green light appears (no right-on-red).

A corresponding set of VLAs for the five NLAs is provided below (with the NLAs included and in italics, for ease of reference). Note that the cross streets expressed in the VLAs are Main Street and First Street.

```
module traffic_checker #( parameter MAX_WAIT = 5)
    (input wire clk,
     input wire rst,
     input wire waiting_main,
     input wire waiting_first,
     input wire green_main,
     input wire green_first,
     input wire yellow_main,
     input wire yellow_first,
     input wire red_main,
     input wire red_first);
// 1)When a green or yellow light is showing, the cross street
// must get a red light.
    assert_hazard_in_first: assert property(@(posedge clk)
        (green_first || yellow_first) |-> red_main);
    assert_hazard_in_main: assert property(@(posedge clk)
        (green_main || yellow_main) |-> red_first);
// 2)Lights must change in the conventional green, yellow,
//red sequence.
    assert_signal_sequencing_on_first : assert property
        (@(posedge clk) yellow_first |=> red_first[*1:$]
        ##1 green_first[*1:$] ##1 yellow_first);
    assert_signal_sequencing_on_main : assert property
        (@(posedge clk)yellow_main |=> red_main[*1:$] ##1
        green_main[*1:$] ##1 yellow_main);
// 3) When traffic is waiting at a red light, it must be
//given a green light if there is no traffic on the cross street.
    assert_green_no_waiting_first: assert property (@(posedge
        clk)(!waiting_main && red_first && waiting_first) |=>
        green_first);
    assert_green_no_waiting_main: assert property (@(posedge
        clk)(!waiting_first && red_main && waiting_main) |=>
        green_main);
// 4)Traffic must not wait more than 5 ticks at a red light, even
// if the cross street has traffic.
    assert_honor_waiting_first: assert property(@(posedge clk)
        ($rose(waiting_first) && red_first)|=> ##[0:MAX_WAIT]
        green_first);
    assert_honor_waiting_main: assert property(@(posedge clk)
        ($rose(waiting_main) && red_main) |=> ##[0:MAX_WAIT]
        green_main);
// 5) When sensors indicate traffic, they do not reset until a
green light appears. (no right-on-red)
    assume_continuous_waiting_first: assume property (@(posedge
        clk) waiting_first && ~green_first |=> waiting_first);
    assume_continuous_waiting_main: assume property (@(posedge
        clk) waiting_main && ~green_main |=> waiting_main);
```

When comparing the NLA versus the corresponding VLA for the above, simple design of a traffic controller, the difficulties of understanding VLAs for increasingly-complex IC designs become apparent. The VLAs of these IC designs are necessary, however, as the mathematical representations of both combinatorial and temporal logic equations that can be used during verification.

Therefore, a process and/or processor that can automatically translate an NLA into a VLA would be highly desirable. Moreover, a process and/or processor that can translate that VLA back into an interpreted NLA could advantageously allow a user to provide a meaningful review of the original NLA, thereby facilitating error detection of the VLA. These translations are described below in reference to FIG. 1.

Figure 1:
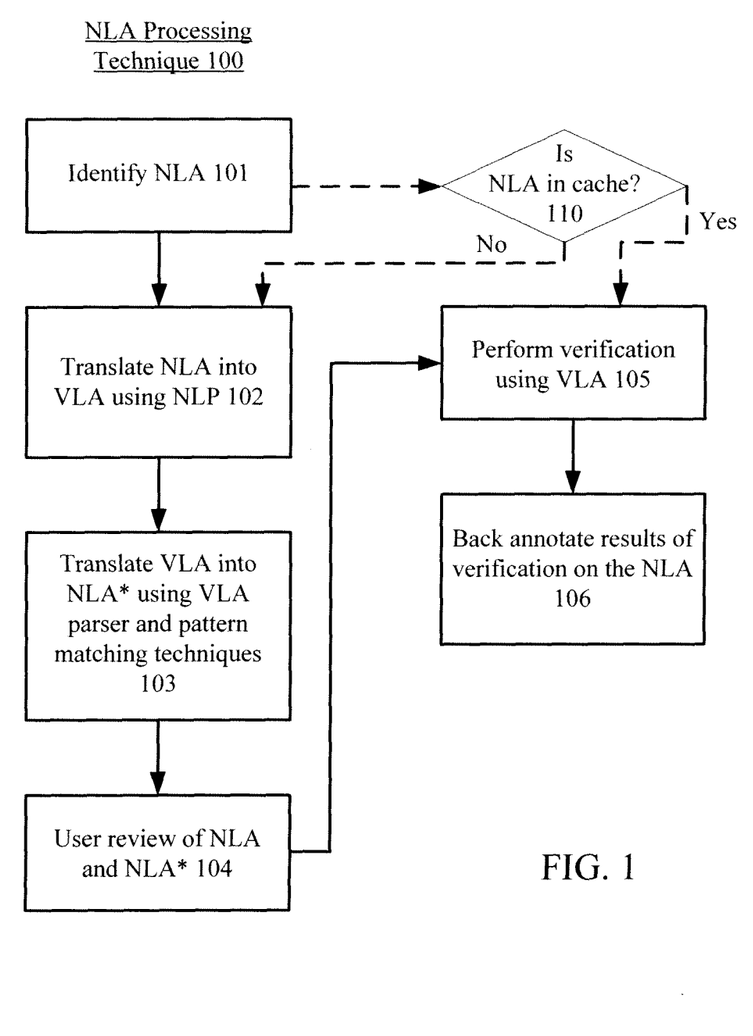
FIG. 1 illustrates an exemplary NLA processing technique.

FIG. 1 illustrates an exemplary NLA processing technique 100. In step 101, an NLA can be identified using known synthesis techniques. For example, in one embodiment, this identification step can be performed using Unix commands that search a module/file for any NLA. Step 101 can further include other synthesis techniques such as extracting the NLA from the RTL so that further processing is performed only on natural language sentences. Any identified and extracted NLA can be copied to a cache for further processing. Information regarding the identified NLA, e.g. the file name, the module name, and the line number, can be associated with the NLA in the cache. In one embodiment, each NLA has a period at the end of the sentence to ensure downstream processing can clearly designate the end of the NLA.

At this point, the NLA can be translated into a VLA using a natural language parser (NLP) in step 102. An exemplary NLP is the Stanford Parser (e.g. version 1.4), which is currently being developed as a new generation search engine for the Internet. Background information on how an NLP (e.g. the Stanford Parser) works is described in, for example: "Fast Exact Inference with a Factored Model for Natural Language Parsing", by Dan Klein and Christopher D. Manning, in Advances in Neural Information Processing Systems 15 (NIPS 2002), Cambridge, Mass.: MIT Press, pp. 3-10 (2003); and "Accurate Unlexicalized Parsing", by Dan Klein and Christopher D. Manning, from Proceedings of the 41st Meeting of the Association for Computational Linguistics, pp. 423-430 (2003).

The NLP used in step 102 can be implemented using any intelligent query tool that can generate semantic trees. An NLP can use probabilistic parsing in which the most likely parse of a given sentence can be computed based on dynamic programming algorithms working on the semantic trees. Clearly, for proper parsing, models for NLPS can be developed for specific languages, e.g. English, Chinese, Arabic, and German.

Exemplary techniques used by the NLA processor to generate the VLA can include, for example, text transformations, text maintenance, and expression matching. Text transformations can include prose to numerical transformation (e.g. zero->0 and one->1) as well as contraction formation (e.g.

should not->shouldn't). Text maintenance can be identified using double quotes. For example, an "a+b" expression in the NLA can be carried over to the VLA as-is. Similarly, when a variable name is an English word, clarification can be achieved by placing that variable name in double quotes (e.g. the NLA may state if "a" occurs, then . . . ). Expression matching looks at multiple terms when bounded by periods. For example, one form of an assertion is a "concurrent assertion" which could be (Clocking sequence) (Antecedent)-> (Consequent). Such an assertion could have a corresponding NLA form such as, "On positive edge of clock clk, if "a" occurs then "b" should occur after n clock cycles." In this case, matching the three distinct parts of the concurrent assertion in the NLA is a pattern matching problem. Another form of an assertion is variable complementing (e.g. "is not high"->low).

In one embodiment, any term in double quotes that is in the NLA can be replaced with a token. The token is a unique identifier like ALIAS01, ALIAS02 . . . that can be treated by the NLP as a noun during input analysis and be found in the semantic tree output of the NLP tagged with the noun property. Simple substitution of that noun by the original term will ensure that the term goes thru the NLP processing preserved. For example, "A" can be replaced with a token, such as the first signal. This replacement can be done automatically by the NLA processor or can be supplemented with user-suggested names. Thus, the input to the natural language parser is fully understandable as specific natural (e.g. English) language components.

Note that translating a large number of NLAs can be resource intensive with respect to CPU time. Therefore, in one embodiment, an NLP can include multiple processors that can parallelize the translation. For example, if the NLP includes 5 processors and there are 1000 NLAS, then each processor could be provided 200 NLAs to translate into VLAs. These translations can occur asynchronously, thereby minimizing processing time. After all translations have been performed, a controller of the NLP can order the results from the various processors to construct the semantic trees.

Note that each semantic tree decomposes a natural language sentence into language use groupings, e.g. nouns, verbs, adjectives, adverbs, etc. In one embodiment, a Semantic tree can be composed of a list of lists. Each atom list is a tuple (2 members) (attribute value). For example, (NN rain) represents the noun "rain".

An exemplary English text and its semantic tree are described below.

The strongest rain ever recorded in India shut down the financial hub of Mumbai, snapped communication lines, closed airports and forced thousands of people to sleep in their offices or walk home during the night, officials said today.

Semantic Tree (ROOT
 (S
  (S
   (NP
    (NP (DT The) (JJS strongest) (NN rain))
    (VP
     (ADVP (RB ever))
     (VBN recorded)
     (PP (IN in)
      (NP (NNP India)))))
   (VP
    (VP (VBD shut)

-continued

Semantic Tree (PRT (RP down))
     (NP
      (NP (DT the) (JJ financial) (NN hub))
      (PP (IN of)
       (NP (NNP Mumbai)))))
    (, ,)
    (VP (VBD snapped)
     (NP (NN communication) (NNS lines)))
    (, ,)
    (VP (VBD closed)
     (NP (NNS airports)))
    (CC and)
    (VP (VBD forced)
     (NP
      (NP (NNS thousands))
      (PP (IN of)
       (NP (NNS people))))
     (S
      (VP (TO to)
       (VP
        (VP (VB sleep)
         (PP (IN in)
          (NP (PRP$ their) (NNS offices))))
        (CC or)
        (VP (VB walk)
         (NP (NN home))
         (PP (IN during)
          (NP (DT the) (NN night))))))))))
   (, ,)
   (NP (NNS officials))
   (VP (VBD said))
   (NP-TMP (NN today)))
  (. .)))

In one embodiment, each language grouping can have a specific descriptor that can be read by a VLA generator. This VLA generator can use the language grouping in the context of the semantic tree to construct the VLA from the NLA. In one embodiment, the VLA generator traverses the semantic tree and visits every node. The VLA generator can keep track of what nodes it has visited, what pattern it has recognized, and a current state of what is the current node and current path in the tree. Partial expressions are matched and finally, when a complete assertion structure is recognized like a "concurrent assertion" (each sub part found a match), then translation to SVA is performed.

In step 103, the VLA can be translated back into an interpreted NLA (NLA*) using a VLA parser and pattern matching techniques. In step 104, a user can review the NLA and NLA* regenerated from the VLA. In step 105, the verification of the VLA can be performed. In one embodiment, this verification can include simulation and formal checking. In step 106, the results of the verification can identify what fails and what passes. In one embodiment, simulators and/or formal verification tools can identify a failing assertion by an error message including the specifics, e.g. the file and line number of the assertion as well as the simulation time of the failure. The results of the verification can be back annotated on the NLA.

In one embodiment, each step can process a plurality of assertions. That is, in step 101, a plurality of NLAs of a module/file may be identified. In step 102, those identified NLAs can be translated to a plurality of VLAs. Then, in step 103, the plurality of VLAs can be translated back into a plurality of interpreted NLAs. Note that in this embodiment, NLAs can be processed at either a module level or a file level.

To provide speed enhancement capability in one embodiment, any newly-identified NLA can be compared in step 110 to a group of NLAs already successfully translated, which are stored in a cache. That is, if an NLA is already processed, then the results of that processing can be reused and the technique can proceed directly to step 105, thereby minimizing overall processing. If the NLA is not already processed, then the technique can proceed to step 102, as previously described.

Notably, the cache can be structured at any hierarchy level, e.g. per design, per user, or per company. In one embodiment, the cache can include the NLA, its semantic tree, and its VLA. Note that by referencing the semantic tree and the VLA to its corresponding NLA, if the NLA is subsequently deleted from the design, then the semantic tree and the VLA can also be easily deleted, thereby minimizing cache space and simulator usage.

Note that, in one embodiment of step 101, the NLA can be included in the RTL (Register Transfer Level) description of the IC. As known by those skilled in the art of IC design, the RTL description is for a synchronous circuit that includes registers and combinational logic. Register transfer level abstraction is typically used in HDL to create high-level representations of an IC. When included in the RTL description, an NLA can follow an RTL entry as a comment. For example, such a comment could be explicitly identified as an NLA and use the signal name(s) referenced in the preceding RTL description, thereby binding the NLA to that RTL description.

In another embodiment of step 101, the NLA can be included in a standard word processing document. This embodiment can be used even before an RTL description of the IC is available. In this embodiment, after the RTL description is available, an additional paragraph can be added to the document that bind each NLA to a specific RTL description, once again using the specific signal(s) used in that RTL description. This type of NLA implementation can advantageously provide a generic document that is adaptable to any test bench. That is, if any signal name changes as a result of a different test bench being used, then only the binding paragraph needs to be changed.

Figure 2:
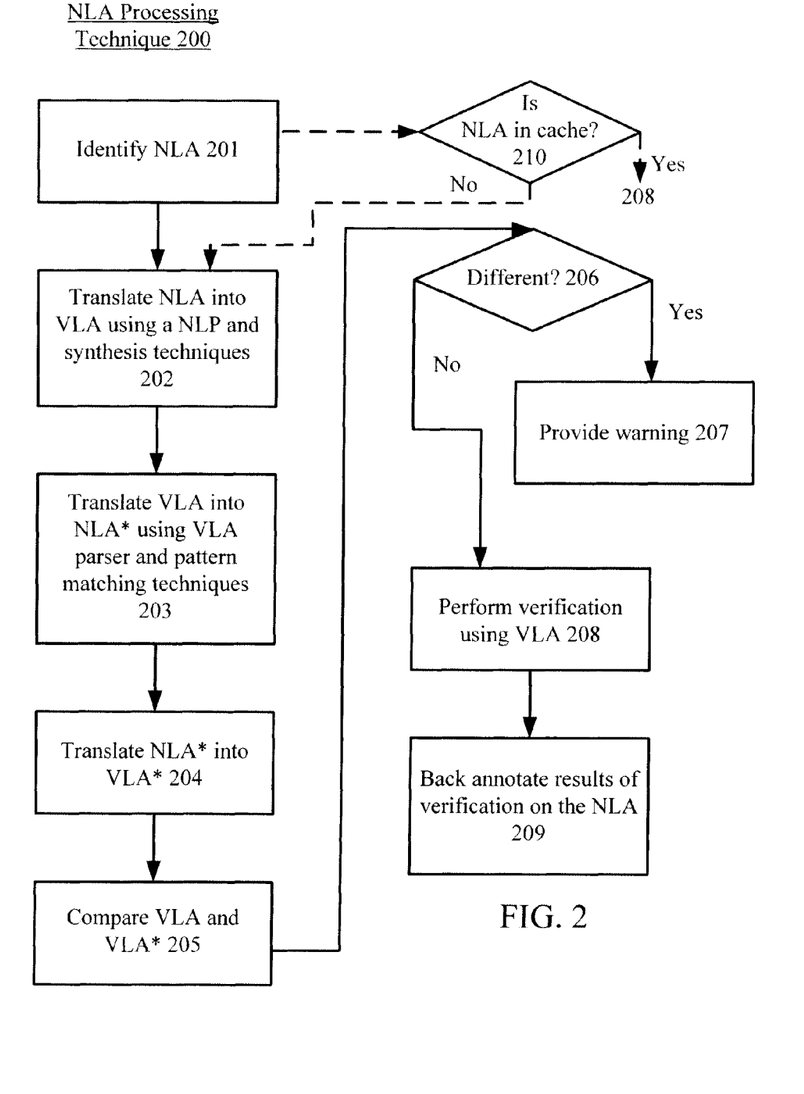
FIG. 2 illustrates another exemplary NLA processing technique that includes auto-verification.

FIG. 2 illustrates another exemplary NLA processing technique 200 that include auto-verification. In step 201 of technique 200, an NLA can be identified. At this point, the NLA can be translated into a VLA using an NLP and synthesis techniques in step 202. In step 203, the VLA can be translated back into an NLA* using a VLA parser and pattern matching techniques. In step 204, the NLA* can be translated into an VLA*. In step 205, the VLA and VLA* can be compared. If the VLA and VLA* are different, as determined in step 206, then step 207 can provide a warning to the user. On the other hand, if the VLA and the VLA* are not different (i.e. the same), then step 208 can perform the verification of the VLA. In one embodiment, this verification can include simulation and formal checking. In step 209, the results of the verification (i.e. an identification of what fails and what passes) can be back annotated on the NLA. Note that in one embodiment, each step can process a plurality of assertions (see description of FIG. 1).

To provide speed enhancement capability in one embodiment, any newly-identified NLA can be compared in step 210 to a group of NLAs already successfully translated, which are stored in a cache. That is, if an NLA is already processed, then the results of that processing can be reused and the technique can proceed directly to step 208, thereby minimizing overall processing. If the NLA is not already processed, then the technique can proceed to step 202, as previously described.

Figure 3A:
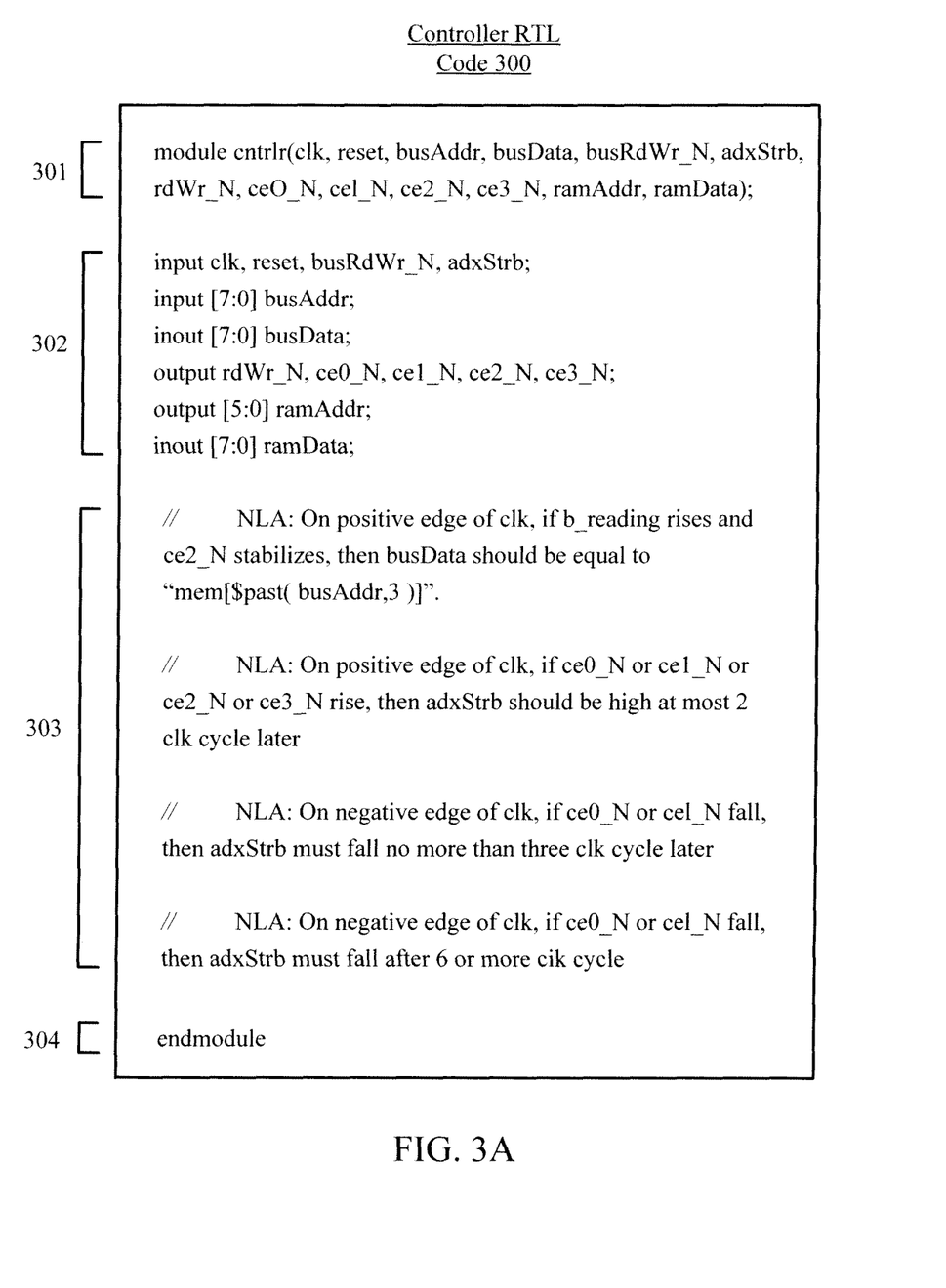
FIG. 3A illustrates exemplary controller RTL code including an RTL identifier, RTL input/output code, embedded NLAs, and an end module designator.
Figure 3B:
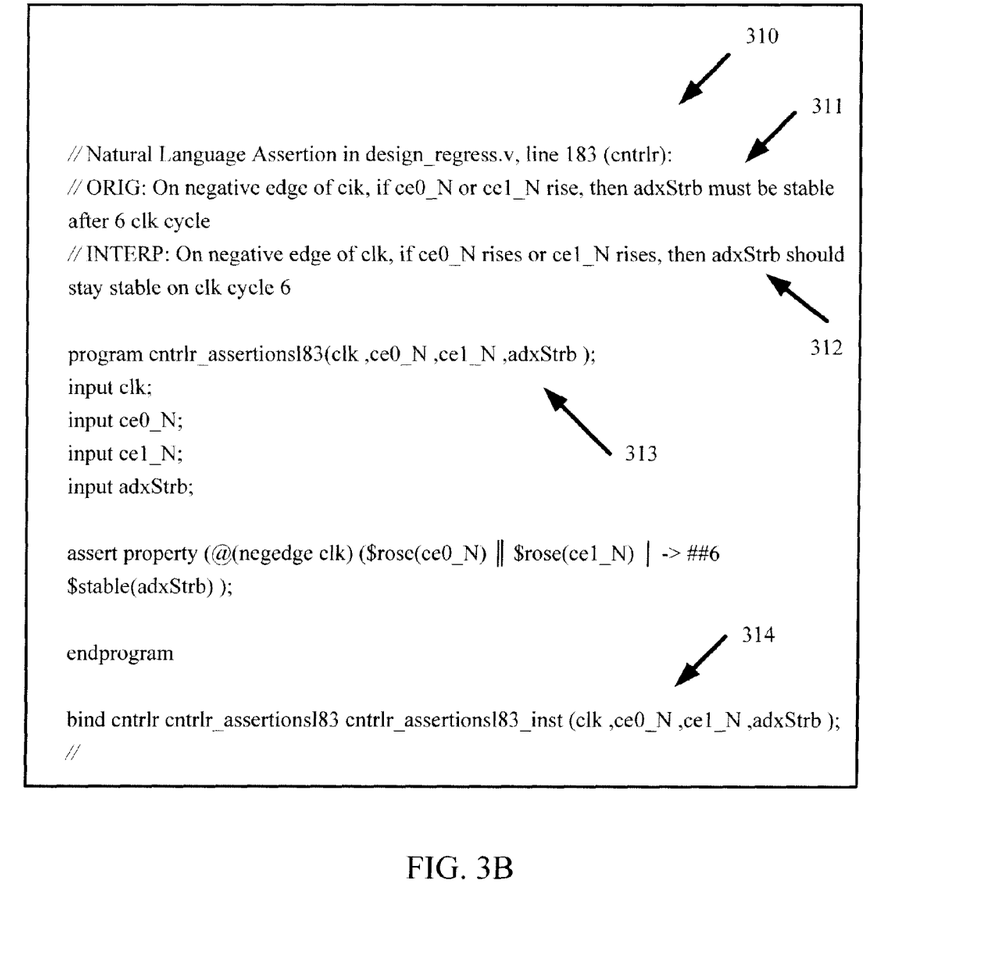
Figure 3C:
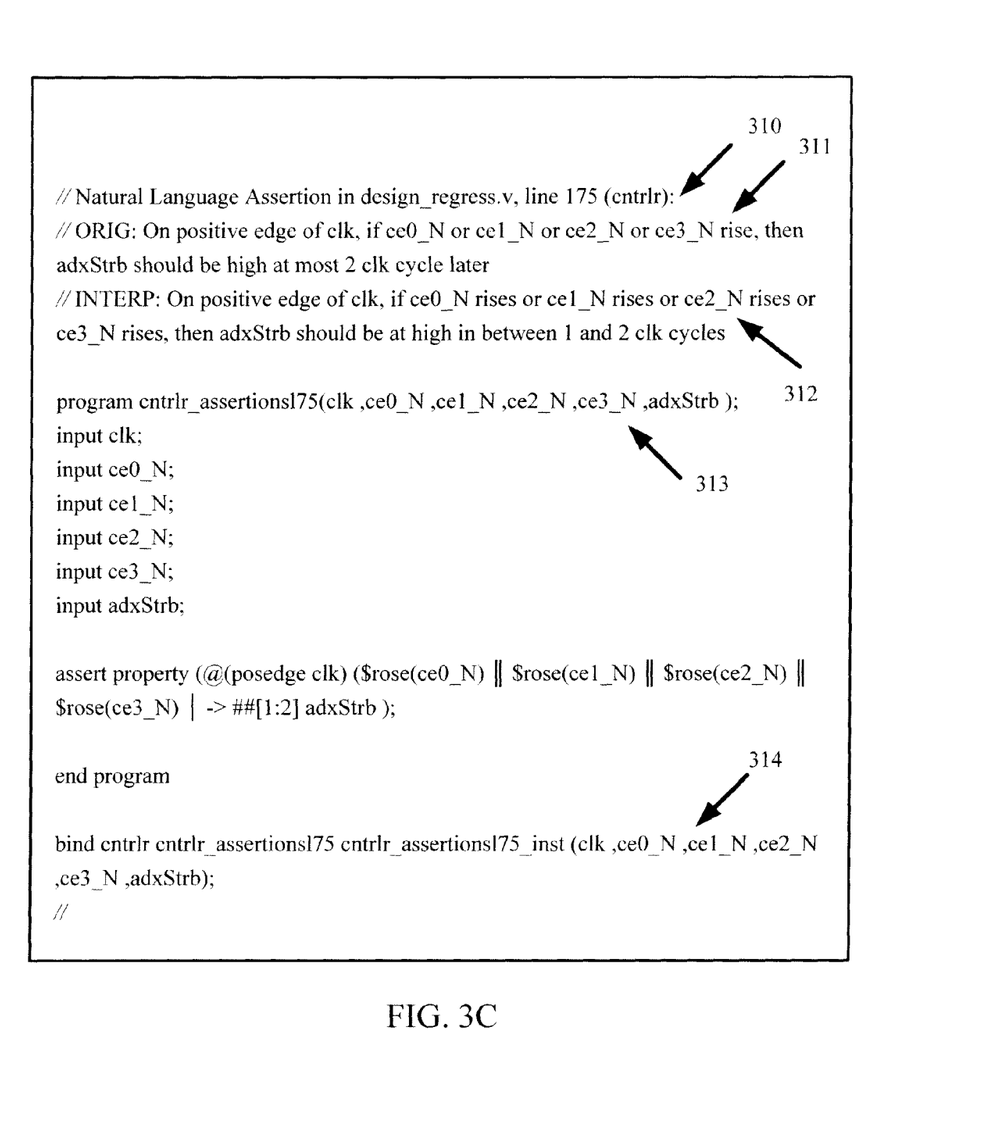
Figure 3D:
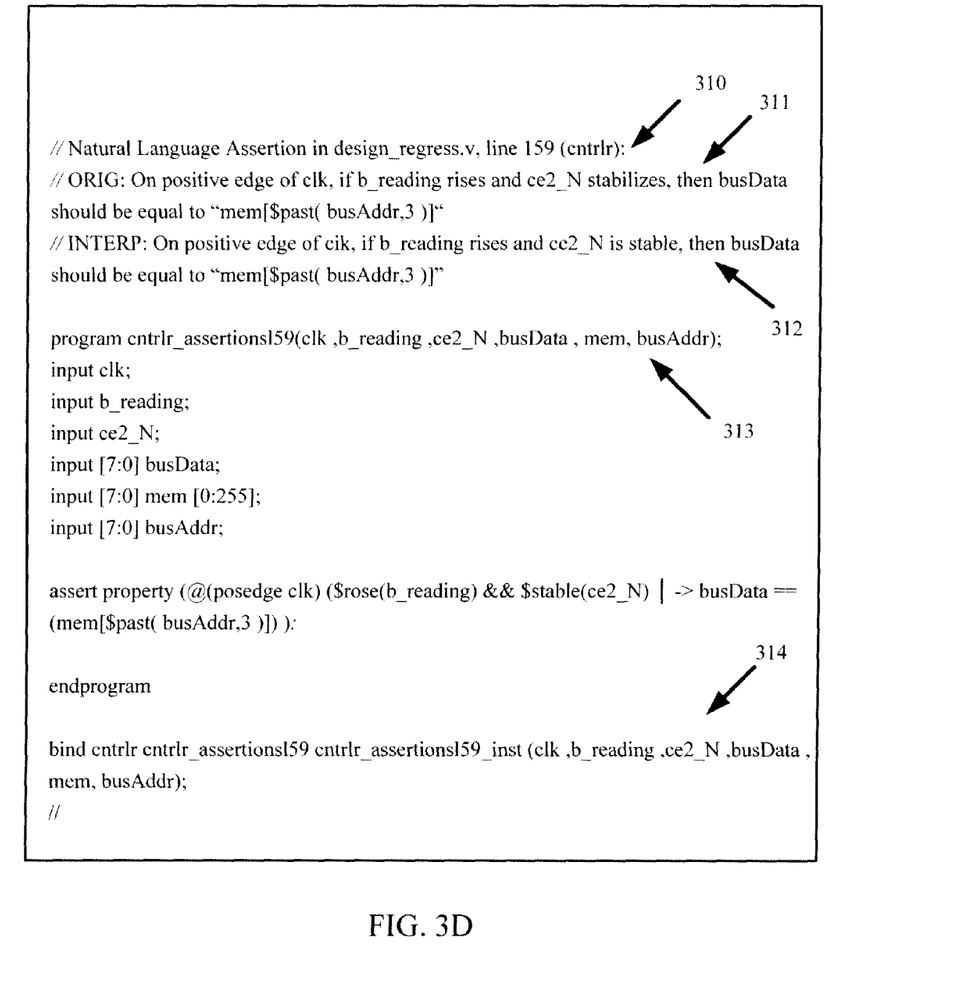
Figure 3E:
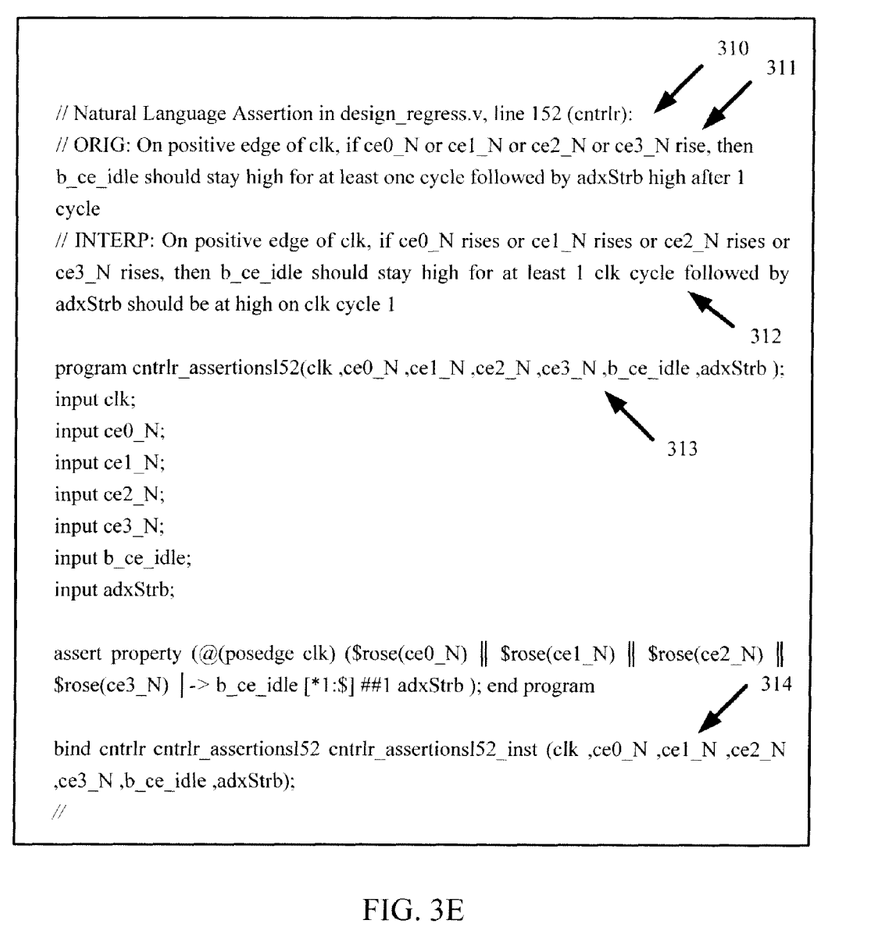

FIGS. 3A illustrates exemplary controller RTL code 300 including an RTL identifier 301 (which identifies the module as being for a controller), RTL input/output code 302, embedded NLAs 303 (in this case, four NLAs), and an end module designator 304. Each of FIGS. 3B-3E illustrates exemplary coding for VLAs and interpreted NLAs generated from original NLAs in accordance with the present invention. Each example coding includes an NLA identifier 310 (in this case indicating line number of the module), the original NLA (ORIG) 311, the interpreted NLA (i.e. NLA*)(INTERP) 312, the VLA generated from the NLA* 313 (first line labeled), and a binding clause 314 that binds the NLA, NLA*, and VLA. Note that binding clause 314 associates the VLA with a particular line number of the module, e.g. in this case, line 175 (note that only the first line in the NLA module can be referenced because each NLA in the module could theoretically be expressed using a plurality of lines).

Figure 3F:
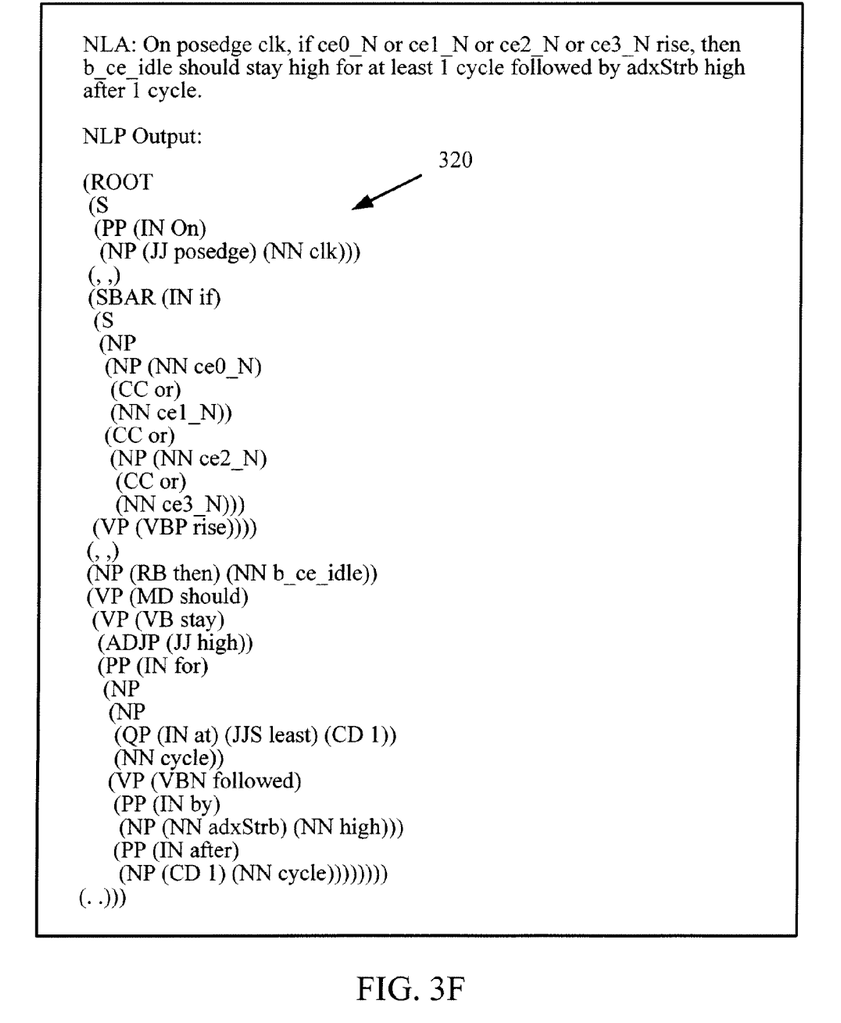
FIG. 3F illustrates exemplary semantic tree output by an NLP based on an NLA.

Note that the interpreted NLA (NLA*) can reflect clarifications to the original NLA. For example, in reference to FIG. 3C, the original NLA states that, "On the positive edge of clk [a clock], if ce0_N [clock enable zero] or ce1_N [clock enable one] or ce2_N [clock enable two] or ce3_N [clock enable three] rises" whereas the interpreted NLA states that, "On the positive edge of clk, if ce0_N rises or ce1_N rises or ce2_N rises or ce3_N rises". Thus, in this translation, the NLA processor has effectively expanded the rise to each signal, thereby clarifying the operation conditions. In another example referring to FIG. 3E, the original NLA states that, "then b_ce_idle should stay high for at least one cycle followed by adxstrb high after 1 cycle" whereas the interpreted NLA states that, "then b_ce_idle should stay high for at least one clk cycle followed by adxStrb should be at high on clk cycle 1". Thus, in this translation, the NLA processor has transformed "cycle" to "clk [clock] cycle", thereby clarifying that term and further clarified that the only one sampling is allowed for each temporal assertion, i.e. the described "if-then" clause is applicable only during clock cycle 1. FIG. 3F illustrates exemplary semantic tree output 320 for a portion of an IC design by an NLP based on an NLA.

Figure 4:
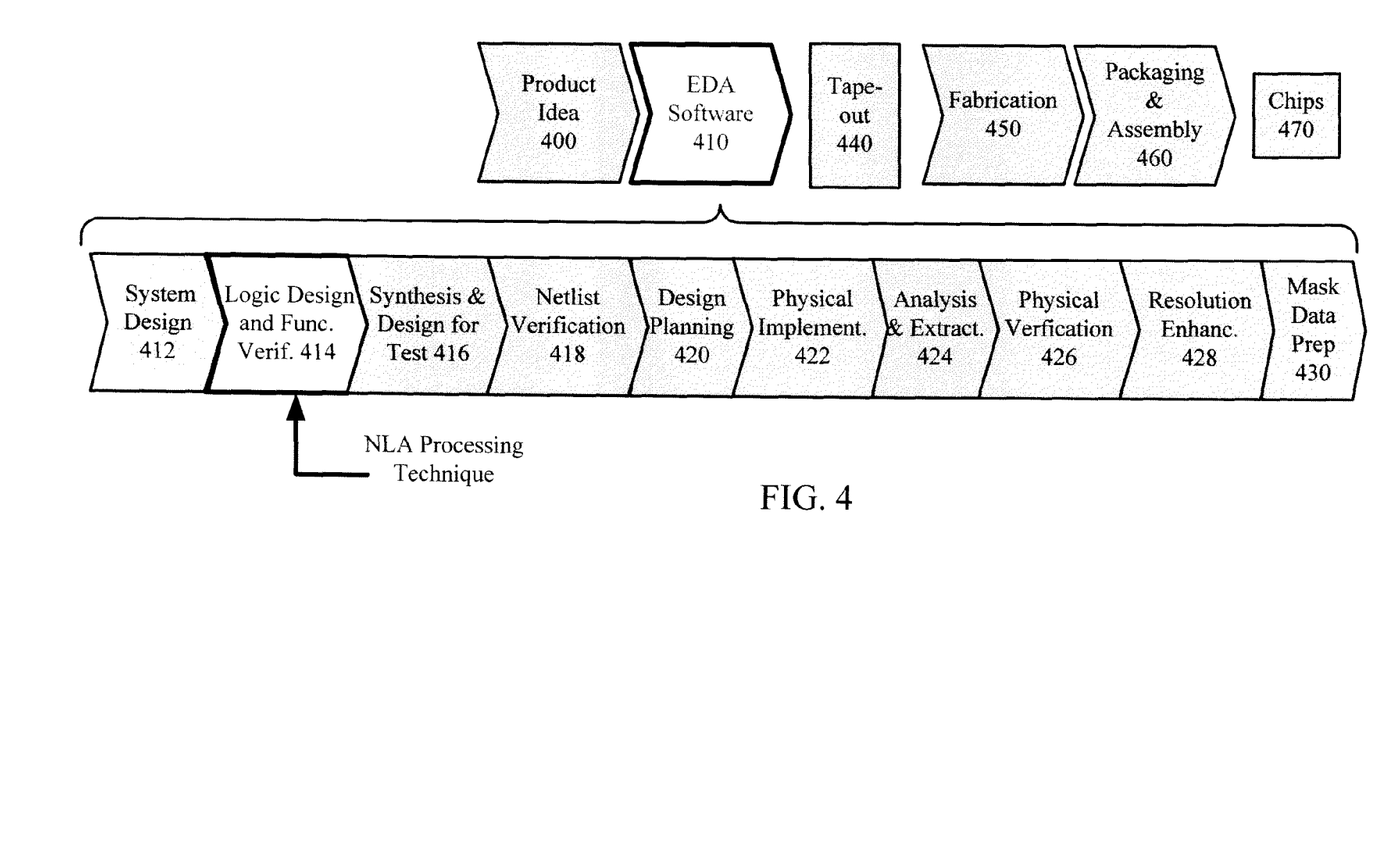
FIG. 4 shows a simplified representation of an exemplary digital ASIC design flow including the NLA processing technique.

FIG. 4 shows a simplified representation of an exemplary digital ASIC design flow including the NLA processing technique. At a high level, the process starts with the product idea (step 400) and is realized in an Electronic Design Automation (EDA) software design process (step 410). When the design is finalized, it can be taped-out (event 440). After tape out, the fabrication process (step 450) and packaging and assembly processes (step 460) occur resulting, ultimately, in finished chips (result 470).

The EDA software design process (step 410) is actually composed of a number of steps 412-430, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 410) will now be provided.

System design (step 412): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 414): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products. In one embodiment, the above-described NLA processing technique can be included in any simulation and verification tool set, e.g. VCS (simulation) and Magellan (verification).

Synthesis and design for test (step 416): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 418): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 420): Here, an overall floorplan for the chip is constructed and analyzed for timing and top-level routing. Exemplary EDA software products from Synopsys, Inc. that can be used at this step include Astro and IC Compiler products.

Physical implementation (step 422): The placement (positioning of circuit elements) and routing (connection of the same) occurs at this step. Exemplary EDA software products from Synopsys, Inc. that can be used at this step include the Astro and IC Compiler products.

Analysis and extraction (step 424): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 426): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 428): This step involves geometric manipulations of the layout to improve manufacturability of the design. Exemplary EDA software products from Synopsys, Inc. that can be used at this step include Proteus, ProteusAF, and PSMGen products.

Mask data preparation (step 430): This step provides the "tape-out" data for production of masks for lithographic use to produce finished chips. Exemplary EDA software products from Synopsys, Inc. that can be used at this step include the CATS(R) family of products.

Figure 5A:
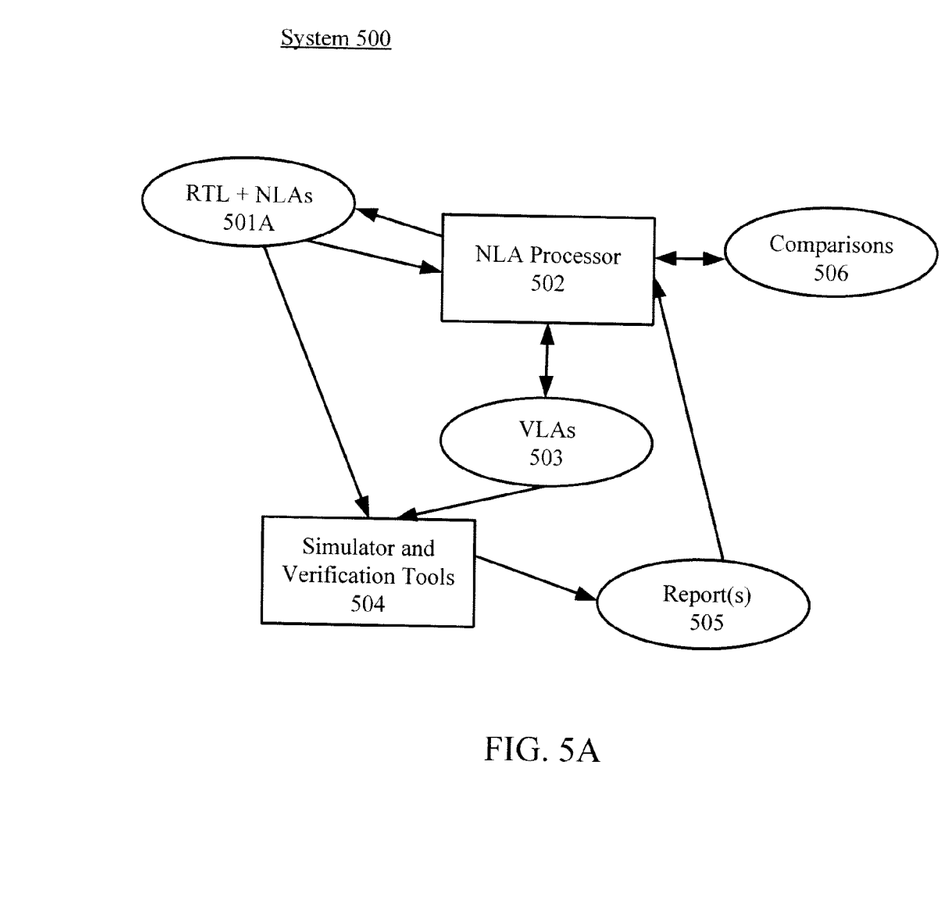
FIGS. 5A and 5B illustrate simplified systems that can implement logic design and functional verification.

FIG. 5A illustrates a simplified system 500 that can implement the above-described logic design and functional verification (step 414). In system 500, an NLA processor 502 can receive an RTL description of an IC and its corresponding NLA, which is embedded in the RTL description, as inputs 501A. Using the NLA portion of inputs 501 (and ignoring the RTL portion), NLA processor 502 can generate corresponding VLAs 503. Simulator and verification tools 504 can receive VLAs 503 and inputs 501 (wherein because the NLAs are comments, only the RTL portion of inputs 501 is actually read by tools 504) to generate one or more reports 505. In one embodiment, reports 505 can identify the VLAs failing in the context of the RTL description.

At this point, NLA processor 502 can advantageously provide the translation of such failed VLAs back into interpreted NLAs and generate comparisons 506, thereby allowing a user to compare the original NLAs and interpreted NLAs and to check for errors. In another embodiment, NLA processor 502 can provide the translation of all VLAs into interpreted NLAs to generate comparisons 506. As a result of comparisons 506, NLA processor 502 can back annotate the NLA portion of inputs 501A.

Figure 5B:
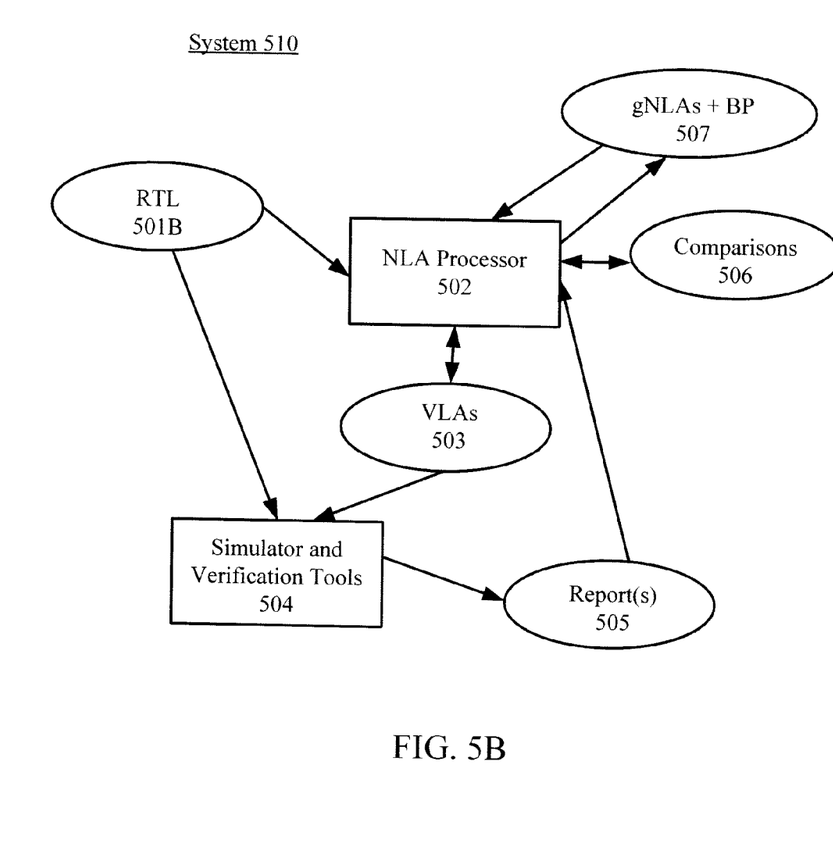

In another embodiment shown in FIG. 5B, the NLA-embedded RTL description 501A can be replaced with an RTL-only description 501B. In this case, system 510 can provide generic NLAs (gNLAs) and a binding paragraph (BP) (i.e. inputs 507) as well as the RTL-only description 501B to NLA processor 502. Using inputs 507, NLA processor 502 can generate corresponding VLAs 503. Note that NLA processor 502 can also receive RTL 501B to identify the ports/variables of the IC design as well as to check that the NLA is referencing objects that exists in the design. Simulator and verification tools 504 can receive VLAs 503 and RTL-only description 501B to generate one or more reports 505. In one embodiment, reports 505 can identify the VLAs failing in the context of the RTL description.

At this point, NLA processor 502 can advantageously provide the translation of such VLAs back into interpreted NLAs and generate comparisons 506, thereby allowing a user to compare the original NLAs and interpreted NLAs and to check for errors. In another embodiment, NLA processor 502 can provide the translation of all VLAs into interpreted NLAs to generate comparisons 506. As a result of comparisons 506, NLA processor 502 can back annotate the binding paragraph of inputs 507.

A process and a processor for NLAs are described above. Conceptually, the process/processor can be characterized as including two distinct techniques. In a first technique, broadly described as transforming the NLA into a VLA, a non-algorithmic technique is used. Essentially, this technique is a type of artificial intelligence. In a second technique, broadly described as transforming the VLA into an interpreted NLA, an algorithmic technique is used. That is, the VLA is fundamentally a mathematical expression. These specific transformations of code provide significant advantages to the users of verification tools, i.e. allowing such users to provide a meaningful review of the VLA via a comparison of the NLA and the interpreted NLA. This review can facilitate error correction of the VLA, with most or all steps being automatically performed by the NLA processor.

The invention can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, in other embodiments, a different NLP can be used, including a completely dedicated NLP to the task at hand. Note that a natural language can be used to describe not only assertions, but test plans, coverage points, and constraints that can similarly be transformed in an HDL or test bench language. In yet other embodiments, the end-user can specify the rules of transformation in between the NLA and VLA. Accordingly, it is intended that the scope of the invention be defined by the following Claims and their equivalents.

The invention claimed is:

1. A method of processing natural language assertions (NLAs), the method comprising:
   demarcating elements of a register transfer language (RTL) description, the elements including at least one of predetermined terms or expressions;
   identifying an NLA;
   using a computer, translating the NLA into a verification language assertion (VLA) using a natural language parser (NLP) and synthesis techniques, wherein said translating includes replacing said elements with tokens, each token being a unique identifier, said tokens being treated by the NLP as nouns, thereby ensuring text maintenance during NLP processing;
   translating the VLA into an interpreted NLA (NLA*) using a VLA parser and pattern matching techniques;
   allowing user review of the NLA* and the NLA; and
   performing verification using the VLA based on the user review.

2. The method of claim 1, further including back annotating results of the verification on the NLA.

3. The method of claim 2, wherein each of the identifying and the translating the NLA processes a plurality of assertions.

4. The method of claim 1, further including comparing the NLA to a set of NLAs in a cache, and proceeding directly to the performing verification when the NLA matches one NLA in the set of NLAs, wherein the verification is performed with a one VLA stored in the cache and associated with the matched NLA.

5. The method of claim 4, further including proceeding to the translating the NLA into the VLA using the NLP and synthesis techniques when the NLA does not match the one NLA in the set of NLAs.

6. A method of processing natural language assertions (NLAs), the method including auto-verification, the method comprising:
   demarcating elements of a register transfer language (RTL) description, the elements including at least one of predetermined terms or expressions;
   identifying an NLA;
   using a computer, translating the NLA into a verification language assertion (VLA) using a natural language parser (NLP) and synthesis techniques, wherein said translating includes replacing said elements with tokens, each token being a unique identifier, said tokens being treated by the NLP as nouns, thereby ensuring text maintenance during NLP processing;
   translating the VLA into an interpreted NLA (NLA*) using a VLA parser and pattern matching techniques;
   translating the NLA* into an interpreted VLA (VLA*);
   comparing the VLA and the VLA*;
   providing a warning when the VLA and the VLA* are different; and
   performing verification using the VLA when the VLA and the VLA* are not different.

7. The method of claim 6, further including back annotating results of the verification on the NLA.

8. The method of claim 7, wherein each of the identifying and the translating the NLA processes a plurality of assertions.

9. The method of claim 6, further including comparing the NLA to a set of NLAs in a cache, and proceeding directly to the performing verification when the NLA matches one NLA in the set of NLAs, wherein the verification is performed with a one VLA stored in the cache and associated with the matched NLA.

10. The method of claim 9, further including proceeding to the translating the NLA into the VLA using the NLP and synthesis techniques when the NLA does not match the one NLA in the set of NLAs.

11. A non-transitory computer-readable medium storing computer-executable instructions for processing natural language assertions (NLAs), which when executed by a computer performs steps of:
    demarcating elements of a register transfer language (RTL) description, the elements including at least one of predetermined terms or expressions;
    identifying an NLA;
    translating the NLA into a verification language assertion (VLA) using a natural language parser (NLP) and synthesis techniques, wherein said translating includes replacing said elements with tokens, each token being a unique identifier, said tokens being treated by the NLP as nouns, thereby ensuring text maintenance during NLP processing;
    translating the VLA into an interpreted NLA (NLA*) using a VLA parser and pattern matching techniques;
    allowing user review of the NLA* and the NLA; and
    performing verification using the VLA based on the user review.

12. The computer-readable medium of claim 11, further including back annotating results of the verification on the NLA.

13. The computer-readable medium of claim 12, wherein each of the identifying and the translating the NLA processes a plurality of assertions.

14. The computer-readable medium of claim 11, further including comparing the NLA to a set of NLAs in a cache, and proceeding directly to the performing verification when the NLA matches one NLA in the set of NLAs, wherein the verification is performed with a one VLA stored in the cache and associated with the matched NLA.

15. The computer-readable medium of claim 14, further including proceeding to the translating the NLA into the VLA using the NLP and synthesis techniques when the NLA does not match the one NLA in the set of NLAs.

16. A non-transitory computer-readable medium storing computer-executable instructions for processing natural language assertions (NLAs), which when executed by a computer performs a process comprising:
    demarcating elements of a register transfer language (RTL) description, the elements including at least one of predetermined terms or expressions;
    identifying an NLA;
    translating the NLA into a verification language assertion (VLA) using a natural language parser (NLP) and synthesis techniques, wherein said translating includes replacing, said elements with tokens, each token being a unique identifier, said tokens being treated by the NLP as nouns, thereby ensuring text maintenance during NLP processing;

translating the VLA into an interpreted NLA (NLA*) using a VLA parser and pattern matching techniques;

translating the NLA* into an interpreted VLA (VLA*);

comparing the VLA and the VLA*;

providing a warning when the VLA and the VLA* are different; and performing verification using the VLA when the VLA and the VLA* are not different.

17. The computer-readable medium of claim 16, further including back annotating results of the verification on the NLA.

18. The computer-readable medium of claim 17, wherein each of the identifying and the translating the NLA processes a plurality of assertions.

19. The computer-readable medium of claim 16, further including comparing the NLA to a set of NLAs in a cache, and proceeding directly to the performing verification when the NLA matches one NLA in the set of NLAs, wherein the verification is performed with one VLA stored in the cache and associated with the matched NLA.

20. The computer-readable medium of claim 19, further including proceeding to the translating the NLA into the VLA using the NLP and synthesis techniques when the NLA does not match the one NLA in the set of NLAs.

21. A system for processing natural language assertions (NLAs), the system comprising:

an NLA processor for demarcating elements of a register transfer language (RTL) description, the elements including at least one of predetermined terms or expressions, and receiving a plurality of NLAs associated with a description of an integrated circuit (IC) and transforming the plurality of NLAs into a plurality of verification language assertions (VLAs), wherein said transforming includes replacing said elements with tokens, each token being a unique identifier, said tokens being treated as nouns, thereby ensuring text maintenance; and a memory coupled to the NLA processor, the memory including a set of simulator and verification tools for receiving the plurality of VLAs and the description of the IC and automatically generating a report of the plurality of VLAs.

* * * * *